Patented Jan. 26, 1937

2,069,019

UNITED STATES PATENT OFFICE 2,069,019

PHYSIOLOGICALLY ACTIVE PREPARATION AND MANUFACTURE THEREOF

Fritz Schultz, Wuppertal-Elberfeld, Germany, assignor to Winthrop Chemical Company, Inc., New York, N. Y., a corporation of New York No Drawing. Application November 6, 1933, Serial No. 696,911. In Germany November 12, 1932

3 Claims. (Cl. 167—74)

This invention relates to a practically stable and water-soluble dry-preparation of kallikrein and to a process of preparing the same.

Preparations containing a physiologically active principle which simultaneously causes a decrease of the blood pressure and an increase of the blood circulation of the lungs, brain, skin and muscles, and which is called "kallikrein" in the scientific literature have been prepared from urine or from aqueous pancreas extracts, for instance, by precipitating the active principle by means of uranyl acetate, iron hydroxide, etc., or by adsorption by means of benzoic acid, aluminium hydroxide, kaolin and the like. From the precipitates or adsorbates the active principle is extracted, for instance, by means of dilute ammonia or diammonium phosphate solution. Benzoic acid has been removed by extraction with an organic solvent, such as alcohol and ethers. The aqueous solutions of the active principle thus obtainable have mostly been freed from salts and other dialysable products by dialysis. Such aqueous solutions of the active principle have been employed directly—if necessary after the removal of coagulable albumen substances—for injection purposes. Experiments to obtain a solid active product from the said active aqueous solutions have hitherto not given satisfactory results since the evaporation of the solutions at a low temperature was very circumstantial in view of intensive foaming of the liquid on evaporation in vacuo and the sensitiveness of the active principle which decomposes at a temperature of about 50° C. The dry substance obtained by such an evaporation has the further disadvantage that it cannot be completely redissolved in water and that substances causing turbidity of such a solution can be removed from the aqueous liquid only with difficulty in view of the colloidal state of these substances. A water-soluble preparation is, however, of great practical interest since the active principle is administered to the patients to a great extent by means of injection.

The present invention provides for a dry-preparation of the active principle which can be completely redissolved in water for the preparation of injection solutions, it further provides for a process by which the said completely water-soluble dry-preparation is obtained without any injurious effect on the active principle and which permits the isolation of the active principle from its aqueous solution in a state of improved purity and in a nearly quantitative yield by a very simple procedure.

In accordance with the present invention a water-soluble and practically stable dry-preparation of kallikrein is obtainable by acting upon an aqueous concentrate of the active principle with an excess of acetone in the presence of an electrolyte at a low temperature so that a complete precipitation of a whitish flocculent precipitate is effected. The said aqueous concentrates of kallikrein are prepared in the manner known per se and set forth above. Acetone acting as the precipitant causes the complete precipitation of the active principle, for instance, in a concentration of about 50 to 70%, the concentration required for a complete precipitation depending on the state of purity of the aqueous starting solution. The temperature should advantageously not exceed room temperature, say about 20° C., but is preferably about 4° C. Electrolytes suitable for the precipitation process are those of non-alkaline character, for instance, sodium chloride and sulfate, potassium and ammonium chloride, ammonium sulfate, etc. Only very small quantities thereof are required, for instance, 0.1% and less. Since the acetone exerts a selective precipitation effect, a preparation is obtained in which the kallikrein activity may be increased by about 100%. The precipitation of the active principle by means of acetone does not take place merely in the presence of albumen substances in which case it obviously separates in the form of an albumen adsorbate, but even if the aqueous starting solution is substantially free from albumen in which latter case a particularly high state of purity is obtained, for instance, a dry product which contains 10,000 kallikrein units (compare Zeitschrift fuer Physiologische Chemie, vol. 175 (1928) pages 97/98) in 1 gram of the dry substance. Aqueous concentrates which substantially have been freed from albumen prior to the acetone precipitation are, therefore, preferably used in the process of the present invention.

The precipitate of the active principle is separated from the precipitation mixture in the usual manner, preferably by centrifuging and advantageously immediately after the precipitation has been effected. The precipitate is then expediently washed with acetone and ether or a mixture thereof and dried at a low temperature, preferably under reduced pressure.

The dry preparation of kallikrein thus obtainable contains at least 5000 kallikrein units in 1 gram of the dry substance. It is practically stable on storage and keeps its activity, for instance, after storage for several months in an incubator at 37° C. It undergoes less than 30% decomposition after storage for a year at 37° C. It dissolves in water to a clear solution, but is insoluble in acetone, alcohols, ether, petroleum ether and benzene. The biuret, ninhydrine, Millon's and the xanthoprotein reaction are negative and Pauly's diazo reaction is weakly positive, uranyl acetate, gold chloride and phosphotungstic acid do but iron chloride, copper sulfate, silver nitrate, mercuric chloride and picrolonic acid do not effect a precipitation in the aqueous solution of the product. The product contains about 12% of nitrogen.

The invention is further illustrated by the following example but it is not restricted thereto:—

*Example.*—8 liters of an aqueous kallikrein solution, containing 80,000 units, being free from salt and albumen, prepared as set forth above and containing one kallikrein unit in 0.3 milligrams of the dry substance, are cooled to 4° C. and treated with 16 liters of acetone of 4° C. thus forming a milky turbidity. On the addition of a small quantity of sodium chloride, say about ½ gram, a white, flocculent precipitate forms which is separated by a well effective centrifuge. The centrifugate is made into a paste by means of dry acetone-ether, sucked off and washed with dry ether. After drying in the air the preparation is pulverized and completely dried in vacuo. The light gray powder is readily and clearly soluble in water. One kallikrein-unit is bound to 0.17 mgs. of organic substance. The biological yield amounts to 90%.

Instead of sodium chloride other electrolytes, for instance, sodium sulfate, ammonium sulfate, potassium and ammonium chloride may be used.

I claim:

1. A physiologically active kallikrein preparation which simultaneously causes decrease of the blood pressure and increase of the blood circulation in the lungs, brain, skin and muscles, in the form of a water-soluble dry powder which is practically undecomposed after storage for several months in an incubator at 37° C., which undergoes less than 30% decomposition after storage for one year at 37° C., but loses its activity when heated to 100° C., which preparation is characterized by the content of at least 5000 kallikrein units in 1 gram of the dry powder, is insoluble in acetone, alcohols, ether, petroleum ether and benzene, the biuret, ninhydrine, Millon's and the xanthoprotein reaction being negative and Pauly's diazo reaction being weakly positive, uranyl acetate, gold chloride and phosphotungstic acid effecting a precipitation, but iron chloride, copper sulfate, silver nitrate, mercuric chloride and picrolonic acid not effecting a precipitation in the aqueous solution of the product, and containing about 12% of nitrogen.

2. In the process of preparing a physiologically active kallikrein preparation which simultaneously causes decrease of the blood pressure and increase of the blood circulation in the lungs, brain, skin and muscles, the steps which comprise separating the active substance from an aqueous concentrate of kallikrein by complete precipitation by means of acetone in the presence of a small quantity of an electrolyte of non-alkaline character, and separating and drying the precipitate, all steps being carried out at a low temperature.

3. In the process of preparing a physiologically active kallikrein preparation which simultaneously causes decrease of the blood pressure and increase of the blood circulation in the lungs, brain, skin and muscles, the steps which comprise separating the active substance from an aqueous concentrate of kallikrein which is substantially free from albumen by complete precipitation by means of acetone in the presence of a small quantity of sodium chloride while cooling, separating the precipitate, washing with acetone and ether and drying the precipitate at a low temperature.

FRITZ SCHULTZ.